United States Patent [19]

Kawakami

[11] Patent Number: 4,549,821
[45] Date of Patent: Oct. 29, 1985

[54] FOIL BEARING
[75] Inventor: Toshiro Kawakami, Ohbu, Japan
[73] Assignee: Aisin Seiki Kabushiki Kaisha, Kariya, Japan
[21] Appl. No.: 552,469
[22] Filed: Nov. 16, 1983
[30] Foreign Application Priority Data Nov. 17, 1982 [JP] Japan .................. 57-201762
Nov. 17, 1982 [JP] Japan .................. 57-201763

[51] Int. Cl.⁴ .............................................. F16C 32/06
[52] U.S. Cl. ..................................... 384/103; 384/106
[58] Field of Search ................. 384/99, 100, 103, 104, 384/105, 106, 119, 124, 125, 215

[56] References Cited

U.S. PATENT DOCUMENTS

| | | | |
|---|---|---|---|
| 3,635,534 | 1/1972 | Barnett | 384/106 |
| 3,809,443 | 5/1974 | Cherubim | 354/106 |
| 4,133,585 | 1/1979 | Licht | 384/103 |
| 4,229,054 | 10/1980 | Miller, Jr. | 384/106 |
| 4,247,155 | 1/1981 | Fortmann | 384/124 |
| 4,262,975 | 4/1981 | Heshmat et al. | 384/119 |
| 4,415,281 | 11/1983 | Agrawal | 384/106 X |

*Primary Examiner*—Stuart S. Levy
*Assistant Examiner*—David Werner
*Attorney, Agent, or Firm*—Oblon, Fisher, Spivak, McClelland & Maier

[57] ABSTRACT

The invention relates to a foil bearing for high speed rotation such as a turbocharger, a high speed centrifugal separator or the like. The foil bearing according to the present invention can form at least three wedge-shaped spaces between the rotary shaft and the top foil along the direction of rotation of the rotary shaft. The rotary shaft can be supported by at least three portions of air sucked in the wedge-shaped spaces so that when the rotary shaft is rotated at a high speed, the axial center thereof is kept more adjacent to that of the top foil at all times based on the wedge effect by the air.

3 Claims, 2 Drawing Figures

FOIL BEARING

BACKGROUND OF THE INVENTION

1. Field of the Invention

This invention relates to foil bearings particularly used for a turbocharger, a high speed centrifugal separator and the like, which are rotated at a high speed.

As one of the air bearings, a foil bearing which employs a plurality of thin metal plates has been known. The foil bearing comprises a damp foil disposed at the inner periphery of a bearing housing for supporting a rotary shaft therein and a top foil disposed at the inner periphery of this damp foil. The rotary shaft is supported by the inner peripheral surface of the top foil in a slidable manner.

The foil type of air bearing is simple in its structure and is produced economically. Therefore, it has been applied to a small-sized gas turbine, a turbo-machine or the like in its practical use.

2. Description of the Prior Art

In the conventional foil bearing, the damp foil is composed of a thin metal plate of a corrugated shape. The corrugated thin metal plate is formed into a cylindrical shape. Whereas, the top foil is also formed into a cylindrical shape by bending a thin metal plate of a rectangular shape. The cylindrical top foil thus formed has an inner diameter slightly larger than an outer diameter of the rotary shaft.

According to this conventional foil bearing, when the rotary shaft is rotated at high speed within an axial hole defined by the inner periphery of the top foil in the foil bearing, the center axis of the rotary shaft is slightly moved from the axis of the top foil in the narrow space formed between the inner peripheral surface of the top foil and the outer peripheral surface of the rotary shaft. As a result, the rotary shaft approaches one side portion of the inner peripheral surface of the top foil thereby to form a space of a wedge shape between the inner peripheral surface of the top foil and the outer peripheral surface of the rotary shaft. Air within the axial hole in the bearing housing is sucked into the wedge-shaped space thus formed due to the rotation of the rotary shaft. In this case, the nearer the top end of the aforesaid wedge-shaped space, the higher the pressure of air sucked thereinto. The rotary shaft is forced by this higher pressure of air so as to return to the center axis of the top foil. Therefore, when the rotary shaft is rotated at a high speed, such a force acts on the rotary shaft and the rotary shaft can return adjacent to the center axis of the top foil, at all times. As a result, the outer peripheral surface of the rotary shaft is not in contact with the inner peripheral surface of the top foil, because there is formed a predetermined narrow space therebetween. Therefore, the rotary shaft is substantially supported by the air within the aforesaid narrow space thereby to have a low coefficient of friction.

However, a turbocharger for an automobile is required to be rotated at an extremely high speed. (In this connection, a gas turbine is run at 60,000 to 70,000 r.p.m., but a turbocharger is run at more than 100,000 r.p.m.) In the conventional foil type of foil bearing, such cannot provide a sufficient damping effect of the rotary shaft when rotated at such an extremely high speed. Therefore, the foil bearing is directly in contact with the rotary shaft because of whirling of the shaft. As a result, seizure is caused between the foil bearing and the shaft. Thus, the conventional foil bearing has the aforesaid disadvantages.

SUMMARY OF THE INVENTION

Accordingly, one object of the present invention is to provide an improved foil bearing which can more effectively have the wedge effect caused by air and which can more precisely support the rotary shaft by such air.

Another object of the present invention is to form at least three wedge-shaped spaces between the inner peripheral surface of the top foil and the outer peripheral surface of the rotary shaft along the direction of rotation of the rotary shaft thereby to facilitate support of the rotary shaft by at least three portions of air based on the wedge effect thereof.

A further object of the present invention is to change pressure load resistance of the damp foil in the circumferential direction thereof, by which the top foil is supported, so as to form a portion which can bear a comparatively high pressure load applied thereto and another portion which can be elastically deformed by a comparatively low pressure load applied thereto along the circumferential direction of the damp foil, so that a cycle of strength (rigidity) and weakness (flexibility) against the applied pressure load can be formed in the damp foil and at least three cycle of the aforesaid portions are formed in the damp foil along the circumferential direction thereof.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
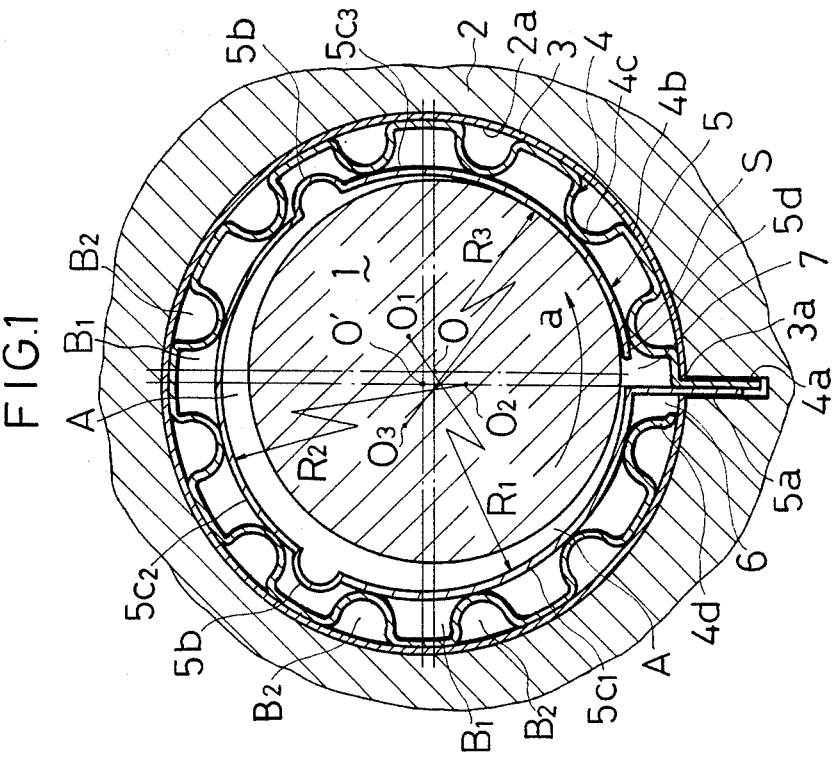
FIG. 1 is a sectional view of essential parts of a foil bearing showing a first embodiment according to the present invention.

According to the present invention, the section of the top foil for supporting the rotary shaft is formed substantially out of round but it is formed into a nearly circular shape. Namely, the top foil comprises at least three arc portions each of which has a larger radius of curvature than that in case the section thereof is formed into a round circle. At each of the aforesaid arc portions having larger radiuses of curvature, a wedge-shaped space or gap is formed between the top foil and the rotary shaft along the direction of rotation of the shaft. In this case, the tip end of the wedge-shaped spaces thus formed is directed to the rotational direction of the shaft. As a result, a wedge effect is brought on the foil bearing according to the present invention.

A first aspect of this invention is directed to a foil bearing which is characterized by a top foil formed into a nearly circular shape in the section thereof. The top foil is formed of at least three arc portions each of which has a larger radius of curvature than that in case the top foil is formed into a round circle and each of the aforesaid arc portions is connected by connecting portions of a predetermined shape.

More preferably, the aforesaid connecting portions, by which each of the arc portions of the top foil is connected, may be formed into a half-circle or a bent of such as Ω shape, which projects in the centrifugal direction of the top foil, in order to reduce the bending resistance thereof.

The center axis of the arc must be in parallel with the axis of the rotary shaft but may be eccentric in a predetermined direction to the axis of the rotary shaft. Because of this eccentricity of the center axis of the arc, the form of the wedge-shaped space can be changed. For example, the space between the top foil and the rotary shaft can be relatively wide in the vicinity of the opening portion of the wedge-shaped portion but can be relatively narrow at the tip end thereof. The wedge-shaped space having the aforesaid form may be formed between the top foil and the rotary shaft thereby to more effectively provide a wedge effect.

A second aspect of this invention is to change the strength of rigidity of load resistance of the damp foil along the circumferential direction of the damp foil. Namely, a portion which can bear a relatively high load applied thereto and another portion which can bear only a relatively low load applied thereto are formed in the damp foil as one cycle thereof, in order to produce predetermined pressure deformations along the direction of rotation of the rotary shaft. And, at least three cycles of the aforesaid rigid portions and flexible portions to a load applied thereto and formed in the damp foil along the circumferential direction thereof. The aforesaid portions in each cycle have respectively different load resistances along the direction of rotation of the rotary shaft.

For example, the damp foil is formed into a nearly corrugated shape in section and the radius of curvature of each of these corrugated portions may be gradually decreased or increased with the advance in the direction of rotation of the rotary shaft. Or, the width of corrugations of the aforesaid corrugated damp foil may be changed. For example, at first, wide-corrugated portions (each of which has a large radius of curvature) are formed in the damp foil and then narrow-corrugated portions (each of which has a small radius of curvature) subsequent to the aforesaid wide-corrugated portions are formed therein. Thus, the wide-corrugated portions and the narrow-corrugated portions connected thereto may be formed in the damp foil as one cycle thereof, and at least three cycles of these portions are formed in the damp foil along the circumferential direction thereof.

In the narrow-corrugated portions each of which has a small radius of curvature, supporting points, each of which supports a load applied thereto, (the number of points to be made in contact with the top foil), are formed much more than those formed in the wide-corrugated portions each of which has a large radius of curvature within a predetermined angle range in the circumferential direction of the damp foil. As a result, the load resistance of the damp foil is further increased in the aforesaid narrow-corrugated portions thereof. Therefore, when the rotary shaft is rotated at a high speed, air within the space between the top foil and the rotary shaft is sucked in the direction of rotation of the rotary shaft thereby to produce air pressure therein, so that even if the top foil is a round circle in section, it is forced by the pressure of air thus produced in the centrifugal direction thereof. As a result, the top foil is elastically deformed by the difference in the load resistance thereof, whereby the top foil does not become a round circle in substance and it changes into a nearly round circle. Consequently, at least three wedge-shaped space are formed between the top foil and the rotary shaft.

Alternatively, the radius of curvature of each of the corrugations of the corrugated damp foil may be regularly changed at a predetermined changing rate along the circumferential direction thereof. Namely, the radius of curvature of each of the corrugations of the damp foil is decreased at first predetermined portions of the damp foil and increased at subsequent second predetermined portions thereof and again decreased at further subsequent third predetermined portions thereof at a predetermined changing rate with regularity. As a result, at least three arc portions are formed in the top foil, each of which has a nearly equal large radius of curvature, based on the aforesaid at least three cycles in the damp foil.

The rate of change in radius of curvature of each of the aforesaid corrugations may be variable.

According to the foil bearing of this invention, at least three wedge-shaped spaces are formed between the top foil and the rotary shaft. Therefore, the rotary shaft is supported by at least three portions of air sucked in the wedge-shaped spaces, each of which has a high atmospheric pressure caused by the wedge effect as described above. Consequently, the center axis of the rotary shaft is kept more adjacent to the center axis of the top foil upon rotation thereof. Therefore, the rotary shaft can be smoothly rotated thereby to be prevented from being made in directly contact with the top foil. Thus, a superior bearing can be obtained.

Preferably, the foil bearing according to the present invention can be used as a bearing for a turbocharger of the like, which is rotated at an extremely high speed so that the rotary shaft thereof is heated to a high temperature. A conventional oil bearing is not fit for use as the aforesaid bearing for the turbocharger.

Hereinafter, the present invention will be explained in accordance with embodiments thereof with reference to the accompanying drawings.

FIG. 1 is a sectional view of a foil bearing showing a first embodiment according to the present invention. In FIG. 1, numeral 1 designates a rotary shaft which is rotated in the direction of an arrow a and a character O designates the center of the aforesaid shaft 1. Numeral 2 designates a bearing housing for supporting the aforesaid rotary shaft 1. The housing 2 is provided with a hole 2a therein, the section of which is a circular shape. In the circular hole 2a, there is disposed a clearance adjusting shim 3 made of a thin plate. This shim 3 is only provided therein for adjusting a clearance formed in the foil bearing device and therefore, it may be omitted if the bearing device is constructed with high precision. The aforesaid shim 3 is provided with an opening 3a and in the opening 3a thereof there are located one end 4a of a damp foil 4 and one end 5a of a top foil 5 so as to meet therein with each other. The damp foil 4 is disposed in the circular hole 2a of the bearing housing 2 along the inner periphery thereof. The top foil 5 is also disposed therein along the inner periphery of the damp foil 4 so as to define the innermost periphery of the hole 2a thereby to support the rotary shaft 1 in the housing. The section of the aforesaid damp foil 4 is of an approximately corrugated shape and comprises a plurality of curved portions 4b, which are in contact with the inner peripheral surface of the aforesaid shim 3, and a plurality of arc-shaped portions 4c, which are in contact with the outer peripheral surface of the top foil 5. The aforesaid curved portions 4b and arc-shaped portions 4c are connected to one another to form the damp foil having the section of an approximately corrugated shape. Further, there is formed a small gap 6 between the other end 4d of the damp foil 4 and the aforesaid straight one end 5a of the top foil 5. Due to provision of this small gap 6, the aforesaid arc-shaped portions 4c of the damp foil 4 can be bent when pressure from the shaft 1 is applied thereto.

The top foil 5 is composed of the aforesaid straight one end 5a, two convex portions 5b and three arc portions 5c1, 5c2, 5c3 in the section thereof. The three arc portions 5c1, 5c2, 5c3 are connected by the aforesaid convex portions 5b. There is also formed another small gap 7 between the connecting portion of the aforesaid straight portion 5a and the other end 5d of the top foil. This small gap 7 is provided to have a free space when the top foil 5 is bent. In the meantime, if the common center of the circular hole 2a of the housing and the shim 3 is designated by O', the center of the three arc portions 5c1, 5c2, 5c3 connected to one another by the respective connecting portions 5b is also O'. The radiuses of curvature of the respective arc portions 5c1, 5c2 and 5c3 and R1, R2 and R3(R1=R2=R3), respectively and therefore, the centers of the aforesaid arc portions 5c1, 5c2 and 5c3 and O1, O2 and O3, respectively.

Character A designates a space formed between the shaft 1 and the top foil 5. Similarly, B1 and B2 designate spaces formed between the damp foil 4 and the top foil 5 and between the damp foil 4 and the shim 3, respectively. The spaces A, B1 and B2 are communicated with an open air through a passage (not shown).

According to the aforesaid construction of the first embodiment, when the rotary shaft 1 is rotated at high speed in the direction of the arrow "a" shown in FIG. 1, an air within the space A formed between the shaft 1 and the top foil 5 is sucked in the aforesaid direction of rotation of the shaft 1. (The phenomenon is referred to as "a squeeze film effect".) As a result, the air pressure in wedge space S becomes high and the center of the shaft 1 is moved upward as shown in FIG. 1 thereby to prevent the direct contact of the rotary shaft 1 and the arc portions 5c3 of the top foil 5. Since the top foil 5 is made of an elastic material, it is elastically deformed when eccentricity is caused in the rotary shaft 1. Therefore, the top foil 5 receives a force in the direction of rotation of the rotary shaft 1 to make the rotary shaft 1 return in the direction of the center thereof.

In the aforesaid first embodiment, three arc portions 5c1, 5c2 and 5c3 are formed in the top foil 5 as the most preferable example. However, the arc portions 5c1, 5c2 and 5c3 are not limited to the aforesaid example but at least three arc portions may be formed in the top foil.

In the foil bearing device according to the first embodiment, the top foil comprises the three arc portions 5c1, 5c2 and 5c3 which are connected to one another through convex connecting portions 5b. Therefore, when the rotary shaft 1 is rotated at high speed, three wedge-shaped spaces S or gaps are formed between the aforesaid rotary shaft 1 and the top foil 5. In addition, there is enough air sucked into the wedge-shaped spaces S to provide high atmospheric pressure between the rotary shaft 1 and the top foil 5. As a result, the rotary shaft 1 is prevented from directly contacting the top foil 5 with no seizure of the rotary shaft 1 and the top foil 5 due to frictional heat thereof. Thus, safe rotation of the shaft 1 at a high speed can be surely obtained.

Hereinafter, a second embodiment according to the present invention will be explained.

Figure 2:
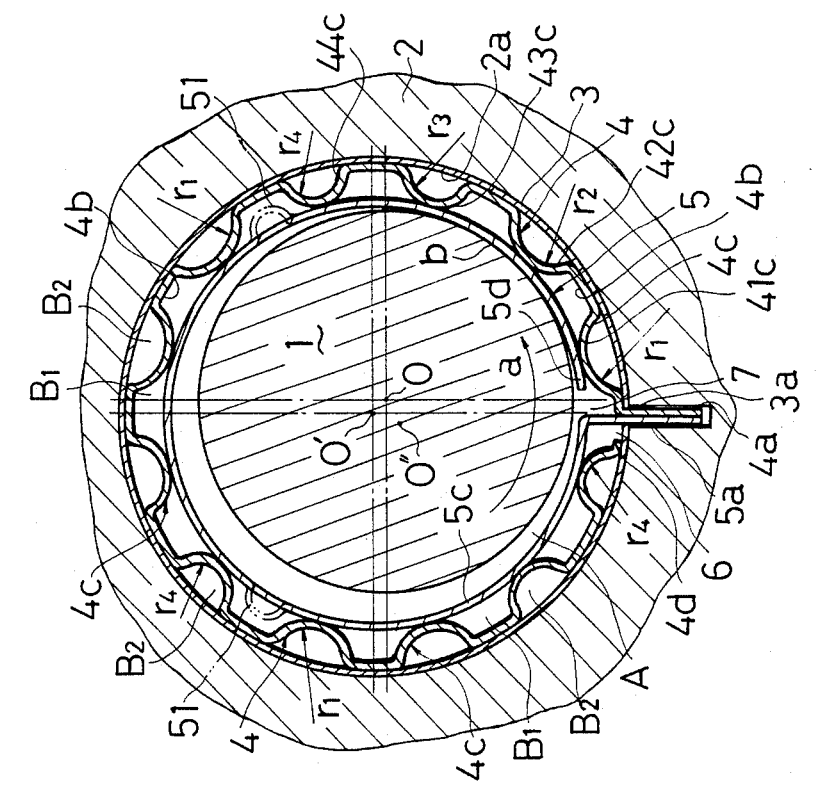
FIG. 2 is a sectional view of essential parts of a foil bearing showing a second embodiment according to the present invention.

FIG. 2 is a sectional view of a foil bearing showing a second embodiment according to the present invention.

The foil bearing according to the second embodiment is the same as that of the first embodiment of this invention in view of the formation of at least three wedge-shaped spaces between the inner peripheral surface of the top foil and the outer peripheral surface of the rotary shaft. Therefore, in FIG. 2, the same parts as those in FIG. 1 showing the first embodiment are shown in the same numerals or the same characters.

Numeral 1 designates a rotary shaft which is rotated in the direction of an arrow a at a high speed and a character O designates the center of the aforesaid shaft 1. Numeral 2 designates a bearing housing for supporting the rotary shaft 1. The housing 2 is provided with a hole 2a therein, the section of which is of a circular shape. In the circular hole 2a, there is disposed a clearance adjusting shim 3 made of a thin plate. This shim 3 is only provided therein for adjusting a clearance formed in the foil bearing device and therefore it may be omitted if the bearing device is constructed with high precision. The aforesaid shim 3 is provided with an opening 3a and in the opening 3a thereof and there are located one end 4a of a damp foil 4 and one end 5a of a top foil 5 so as to meet therein with each other. The damp foil 4 is disposed in the circular hole 2a of the bearing housing 2 along the inner periphery thereof. The top foil 5 is also disposed therein along the inner periphery of the damp foil 4 so as to define the innermost periphery of the hole 2a thereby to support the rotary shaft 1 in the housing.

According to the second embodiment, the section of the damp foil 4 is of a nearly corrugated shape and comprises a plurality of curved portions 4b (e.g., eleven curved portions on FIG. 2) having large radiuses of curvature, which are in contact with the inner peripheral surface of the shim 3, and three cycles of a plurality of arc-shaped portions 4c having small radiuses of curvature, which are in contact with the outer peripheral surface of the top foil 5. The aforesaid curved portions 4b and arc-shaped portions 4c are alternately connected to one another to form the corrugated damp foil 4. Each of the three cycles of arc-shaped portions 4c having small radiuses of curvature consists of four arc-shaped portions 41c, 42c, 43c and 44c, radiuses of curvature of which are r1, r2, r3 and r4 (r1>r2>r3>r4), respectively.

Further, there is formed a small gap 6 between the other end 4d of the damp foil 4 and the aforesaid straight one end 5a of the top foil 5. Therefore, if pressure is applied to the damp foil 4 from the shaft 1, the three cycles of arc-shaped portions 4c can be bent because of a free space of this small gap 6.

The section of the top foil 5 is composed of the aforesaid straight one end portion 5a and a circular portion 5c connected thereto. There is also formed another small gap 7 between the connecting portion of the straight portion 5a and the circular portion 5c and the other end 5d of the circular portion 5c. This small gap 7 is provided to have a free space when the aforesaid top foil 5 is bent.

Character O' designates the common axial center of the aforesaid circular hole 2a of the housing 2 and shim 3. Character A designates a space formed between the rotary shaft 1 and the top foil 5. Similarly, B1 and B2 designates spaces formed between the damp foil 4 and the top foil 5 and between the damp foil 4 and the shim 3, respectively. These spaces A, B1 and B2 are communicated with open air through a passage (not shown).

According to the aforesaid construction of the second embodiment, when the rotary shaft 1 is rotated at high speed in the direction of arrow a as shown in FIG. 2, air within the space A formed between the shaft 1 and the top foil 5 is sucked in the aforesaid direction of rotation. (This phenomenon is referred to as a squeeze film effect".) As a result, the axial center of the shaft 1 is moved upward. Since the damp foil 4 has elasticity and also air comes in or goes out of the spaces B1 and B2, a damping effect such as a shock absorber can be thereby provided.

More particularly, for example, if the axial center of the shaft 1 being rotated at high speed is eccentrically moved so as to be in contact with the top foil 5 at a point b (as it is, the shaft 1 is not in contact therewith at the point b), the center of curvature of the shaft 1 in the vicinity of the point b of the top foil 5 is moved to a point O'' from the center O' of the bearing housing 2. Because each of the three cycles of arc-shaped portions 4c consists of four arc-shaped portions 41c, 42c, 43c and 44c having respectively different radiuses of curvature, each of which is more reduced with the advance in the direction of rotation of the shaft 1 (the direction of a in the case of FIG. 1). Therefore, flexible amounts of the four arc-shaped portions 41c to 44c in each cycle can be defined such that $41c > 42c > 43c > 44c$ due to the differences in their flexibilities based on the respectively different radiuses of curvature thereof. In other words, since the relation of $r1 > r2 > r3 > r4$ is provided, the axial center O of the rotary shaft is moved as described above.

Thus, there is caused the eccentricity of the center of the bearing to the center of curvature thereof so that the wedge effect due to the film (the squeeze film effect) is increased to thereby suppress rocking vibration of the rotary shaft 1 more effectively.

In the aforesaid second embodiment, the top foil comprises the straight end portion 5a and the circular portion 5c in the section thereof, but the aforesaid circular portion 5c is not limited to the configuration as shown in this embodiment. For example, a plurality of convex portions 51 may be disposed in the circular portion 5c.) Therefore, in the resulting top foil 5 having the convex portions 51, at least three arc portions may be formed, each of which has a larger radius of curvature than that of the initial circular portion 5c. In FIG. 2, there are shown two convex portions 51 disposed in the circular portion 5c at respectively equal intervals.

Therefore, in this case, three arc portions, which are connected to one another by the convex portions 51, can be formed in the top foil 5.

In the aforesaid second embodiment, the rotary shaft 1 is rotated in the counterclockwise direction but may be rotated in the clockwise direction. In this case, the arc-shaped portions in each cycle may be formed to have respectively larger radiuses of curvature with the advance in the direction of arrow a as shown in FIG. 2. In other words, the damp foil according to the second aspect of the present invention is characterized in that the arc-shaped portions in each cycle are formed to have respectively different radiuses of curvature with the advance in the direction of rotation of the rotary shaft.

Although the three cycles of arc-shaped portions 4c having gradually smaller radiuses of curvature in the direction of rotation of the shaft are formed in the damp foil in this second embodiment, as shown in FIG. 2, the cycle thereof is not limited thereto. In the present invention, at least three cycles thereof can be formed in the damp foil.

What is claimed is:
1. A foil bearing, comprising:
   a bearing housing provided with an axial hole therein;
   a damp foil supported in said bearing housing at an inner periphery thereof; and
   a top foil supported in said bearing housing at an inner periphery of said damp foil, wherein said top foil is made of a single sheet of metal and further comprises at least three arc portions connected to one another through at least two connecting portions so as to have a nearly circular shape in section, each of said arc portions having a larger radius of curvature than the length between the center of said top foil and any point on said arc portions, and each of said connecting portions is of a shape so as to project in a centrifugal direction.

2. A foil bearing according to claim 1, further comprising a clearance adjusting shim made of a thin plate provided on the inner surface of said axial hole and wherein said damp foil is supported at the inner surface of said clearance adjusting shim.

3. A foil bearing according to claim 1, wherein:
   said top foil has a bent end uniformly provided at a free side of said arc portions and said damp foil has a bent end provided uniformly at a free side thereof; and
   said bent end of said top foil and said bent end of said damp foil meet with each other and are located in said groove of said axial hole.

* * * * *